Figure 1:
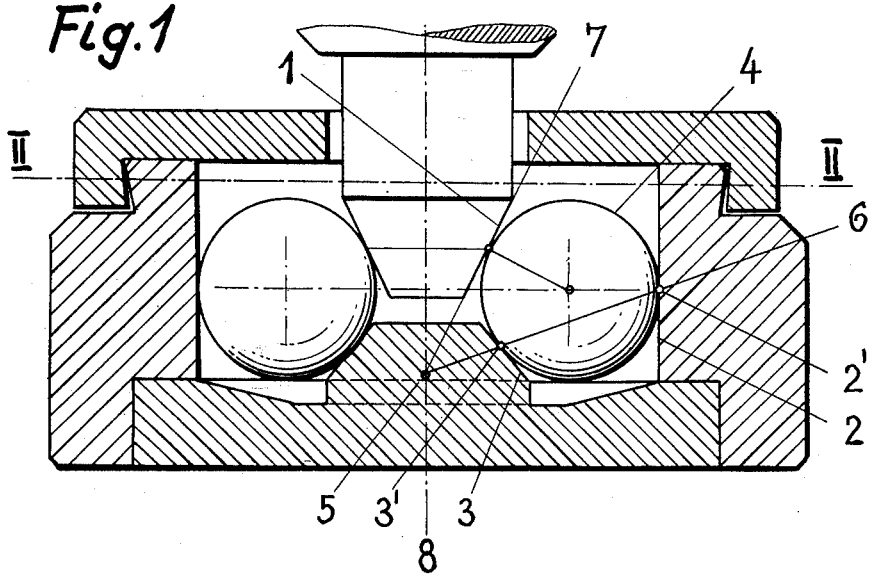

Dec. 23, 1952 — O. TSCHUDIN — 2,622,948
BALL BEARING FOR CONE-SHAPED JOURNALS OF SHAFTS
Filed Jan. 31, 1950

Inventor: Oswald Tschudin

Patented Dec. 23, 1952

2,622,948

UNITED STATES PATENT OFFICE 2,622,948

BALL BEARING FOR CONE-SHAPED JOURNALS OF SHAFTS

Oswald Tschudin, Weil-on-the-Rhein, Germany

Application January 31, 1950, Serial No. 141,422
In France February 14, 1949

5 Claims. (Cl. 308—230)

The present invention relates to ball-bearings for shafts provided with cone-shaped ends or journals, and is particularly directed to a bearing of this type of very smallest size intended for use as a bearing for the shafts of the balance-wheels of watches, that is to say for shafts performing a reciprocating rotary movement.

For journaling the shafts of balance-wheels of watches ball-bearings can be used with considerable advantage, as ball-bearings provide a maximum of protection against shocks, and because of the further reason that ball-bearings need no lubricating oil, so that the proper working of the watch can not be interfered with by the instability or condition of such oil. But, naturally, ball-bearings of this kind have to be very small, and that is why it is no simple matter to devise such bearings in such a way that they can be relied upon to function in a perfect manner and that the advantages connected with the use of such bearings are actually and fully realized.

It has already been known to provide the shafts of balance-wheels with ball-bearings in such a way that the balls of the bearings are at their inside resting against the cone-shaped end of the shaft and at their opposite side supported by a ring, shaped on its inside like a hollow ball, whose radius exceeds in length that of the radius of the bearing-balls, so that the balls positioned between the cone-shaped journal of the shaft and the supporting ring are supported only at two points. The disadvantage of this known bearing resides in the fact that the balls can not, at the place where they are in contact with the journal of the shaft, perform a rolling movement pure and simple, but that there also is a sliding movement resulting in an increased wear on the bearing parts, which wear, considering the small dimensions of the parts, must naturally have its serious effects on the satisfactory operation and lifetime of the bearings. There also is the further drawback in two-point-contact bearings of this type that there may easily be a clamping or braking movement occurring when the balls are sliding into contact with each other because of the uncontrolled and even non-uniform manner in which the balls are moving at the aforesaid place of contact with the cone-shaped end of the shaft. And, finally, there is the difficulty of the exact and uniform manufacture of this known bearing provided with the cup-shaped ring.

The object of the present invention is to provide a ball-bearing in which with the aid of a fundamentally novel type of construction the aforedescribed disadvantages are obviated in an efficient and satisfactory manner. A particular object of the application is the provision of a ball-bearing of smallest size and so devised that at the points where the balls are in contact with the cone-shaped end of the shaft solely and exclusively a rolling movement occurs. The invention further contemplates to construct the bearing in such a manner that the bearing-balls, because of the way in which they are arranged in the bearing, perform a minimum of translation movement, corresponding essentially to rotation on the spot. And a still further object of the invention is to devise the novel bearing in such a way that it can be made up, in spite of its minuteness, of a plurality of separate parts which can be accurately manufactured without difficulty and at small expense.

All of these objects are attained by the invention in a perfectly satisfactory way.

According to the invention the bearing means for the balls consist of an inner cone-shaped supporting member, positioned opposite the conical end of the shaft and coaxially therewith, and an outer annular supporting member likewise arranged coaxially with said conical shaft-end and said inner supporting cone, so that the balls are reliably and non-clampingly supported between three points of contact with the inner supporting cone, the outer supporting ring and the tapered surface of the cone-shaped journal of the shaft in every position of the latter. If, furthermore, the arrangement is so devised that the momentary axes of rotation or lines extending through the momentary points of contact between the balls and the conical end of the shaft and between the balls and their momentary points of contact with their inner conical support and their outer supporting ring will intersect a line drawn through the momentary axis of the shaft at a common intersecting point, it is obvious that a construction of that type fulfills a kinematic requirement which makes it possible that at the point of contact between the balls and the cone-shaped end of the shaft the desired genuine rolling movement can take place. The creation of this genuine rolling movement at the places of contact where the greater relative rolling speeds occur, is an important and valuable feature of the present invention, as it reduces the wear and prolongs the lifetime of the bearing to a maximum of what can be expected. On the other hand, the support of the balls by means of the supporting cone and the outer ring results in a minimum of ball translation about the mainaxis of the bearing and consequently also in very small rolling speeds between the balls and their supporting means.

The mixture of rolling and sliding movement occurring at the places where the balls are in contact with the supporting cone and supporting ring is a so-called infinitesimal boring movement, and for that reason can result only in an insignificant degree of wear at the places in question. Furthermore, the small amount of ball translation obtained through a construction of this kind in combination with the reciprocating rotary movement of the shaft of the balance-wheel will reduce the probability of possible contact of the balls with one another to a minimum.

Theoretical as well as practical tests have shown that in bearings for the balance-wheels of watches four bearing-balls should be employed. The most favorable angles for the tapered ends of the shaft are between 40° and 60°, and for the supporting cone between 80° and 140°. A favorable ball-diameter for the bearing of the balance-wheel of ordinary pocket-watches is 0.4 mm., and for wrist-watches 0.36 mm.

Additional features and advantages of the invention will be understood from the following detailed description, taken in connection with the accompanying drawings, showing by way of example an embodiment of the invention. However, it is to be understood that the invention is not confined to any strict conformity with the showing of the drawings, but may be changed or modified, so long as such changes or modifications mark no material departure from the salient features of the invention as expressed in the appended claims.

In the drawings, in which similar numerals of reference indicate corresponding parts in both of the figures, Fig. 1 is a diagrammatic illustration of the bearing, showing the three points of contact of the balls with their supporting means and with the tapered end of the shaft.

Figure 2:
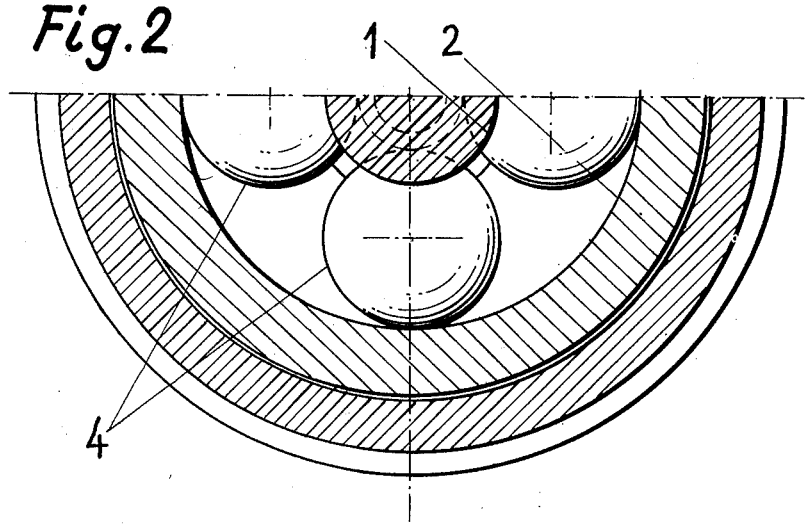

Fig. 2 is a cross-section through half of the bearing on line II—II of Fig. 1.

Referring now to the drawings in detail, the reference numeral 1 denotes the cone-shaped end of the shaft of the balance-wheel positioned with respect to the bearing-balls 4 in such a way that it is in constant rolling contact with the surface of the latter. The balls 4 are at their opposite side supported in rolling position in a V-shaped annular rolling path formed by the concentrically disposed outer supporting ring 2 and inner supporting cone 3. In an arrangement like this it is a sine qua non condition that the construction is so devised that the axis of rotation 8 of the cone 1 and the axes or lines extending through the momentary points of rolling contact 7, between the cone 1 and the balls 4, and the momentary points of rolling contact 6, between the balls 4 and the supporting ring 2 and supporting cone 3, intersect one another at a common intersecting point 5, in order to establish between the cone of the shaft and the balls the aforesaid important genuine rolling contact. There, consequently will be a so-called infinitesimal boring movement only at the points of contact 2' and 3', whereby because of the use of a supporting cone only insignificant speeds will occur.

With the aid of the supporting cone 3 the invention provides a bearing which, if the condition regarding the common intersecting point of the axis of rotation of the cone of the shaft with the lines extending through the points of rolling contact is observed, is well suited as a bearing for the shaft of the balance-wheel of a watch, as it creates for the reciprocating time controlling means of the latter only insignificant additional moments of inertia.

The new bearing can without difficulty be produced in an accurate and inexpensive manner, as the bearing means consist of two parts and as all of the surfaces on which a rolling movement takes place need to be curved only one way. If the cone of the shaft is provided with a slightly concave surface, or if the supporting ring 2 for the balls 4 is of slightly spherical formation, it is necessary, that the surfaces of contact should again be so devised that the lines extending through the points of contact and the axis of the shaft intersect one another in the aforedescribed way. It may further be mentioned that the supporting ring 2, which according to Figs. 1 and 2 is of hollow cylindrical shape, may also be so designed that its inner surface is of downwardly tapered formation.

What I claim as new and desire to secure by Letters Patent of the United States is:

1. A ball-type thrust bearing for a rotatable shaft having at its end portion a conical bearing face, comprising in combination, a central support having an outwardly facing conical ball supporting face facing with its apex the rotatable shaft and arranged coaxially with the same; a peripheral support having an inwardly facing peripheral ball supporting face arranged coaxially with the axis of rotation of said shaft; and a plurality of balls supported by said outwardly facing conical ball supporting face of said central support and said inwardly facing annular ball supporting face of said peripheral support while contacting the conical bearing face of the rotatable shaft so as to support the same.

2. A ball-type thrust bearing for a rotatable shaft having at its end portion a conical bearing face, comprising in combination, a central support having an outwardly facing conical ball supporting face facing with its apex the rotatable shaft and arranged coaxially with the same; a peripheral support having an inwardly facing peripheral cylindrical ball supporting face arranged coaxially with the axis of rotation of said shaft; and a plurality of balls supported by said outwardly facing conical ball supporting face of said central support and said inwardly facing annular ball supporting face of said peripheral support while contacting the conical bearing face of the rotatable shaft so as to support the same.

3. A ball-type thrust bearing for a rotatable shaft having at its end portion a conical bearing face, comprising in combination, a central support having an outwardly facing conical ball supporting face facing with its apex the rotatable shaft and arranged coaxially with the same; a peripheral support having an inwardly facing peripheral conical ball supporting face tapered downwardly and arranged coaxially with the axis of rotation of said shaft; and a plurality of balls supported by said outwardly facing conical ball supporting face of said central support and said inwardly facing annular ball supporting face of said peripheral support while contacting the conical bearing face of the rotatable shaft so as to support the same.

4. A ball-type thrust bearing for a rotatable shaft having at its end portion a conical bearing face, comprising in combination, a central support having a conical ball supporting face facing the conical bearing face of the rotatable shaft and having an axis coinciding with the axis of the same; a peripheral support having a cylindrical ball supporting face facing the conical bearing face of the rotatable shaft; a plurality of balls contacting during rotation said conical bearing face of said shaft along a circular line of contact and being supported by said ball supporting faces of said supports and contacting the same during rotation along an inner, and an outer circular line of contact, respectively, said circular lines located in parallel planes normal to the axis of the conical bearing face of the rotatable shaft and having their centers located in the axis thereof, said supports being arranged on said supporting faces thereof being shaped so that said circular lines of contact are located in an imaginary conical surface the apex of which coincides with the apex of said conical bearing face.

5. A ball-type thrust bearing for a rotatable shaft having at its end portion a conical bearing face, comprising in combination, a central support having a conical ball supporting face facing the conical bearing face of the rotatable shaft and having an axis coinciding with the axis of the same; a peripheral support having a conical ball supporting face tapered downwardly and facing the conical bearing face of the rotatable shaft; a plurality of balls contacting during rotation said conical bearing face of said shaft along a circular line of conatct and being supported by said ball supporting faces of said supports and contacting the same during rotation along an inner, and an outer circular line of contact, respectively, said circular lines located in parallel planes normal to the axis of the conical bearing face of the rotatable shaft and having their centers located in the axis thereof, said supports being arranged and said supporting faces thereof being shaped so that said circular lines of contact are located in an imaginary conical surface the apex of which coincides with the apex of said conical bearing face.

OSWALD TSCHUDIN.

REFERENCES CITED

The following references are of record in the file of this patent:

UNITED STATES PATENTS

| Number | Name | Date |
| --- | --- | --- |
| 593,695 | Snyder | Nov. 16, 1897 |
| 847,803 | Morgan | Mar. 19, 1907 |
| 1,305,144 | Mayes | May 27, 1919 |
| 1,907,792 | Greenleaf | May 9, 1933 |

FOREIGN PATENTS

| Number | Country | Date |
| --- | --- | --- |
| 129,830 | Germany | Apr. 18, 1902 |
| 217,848 | Great Britain | June 26, 1924 |